United States Patent
Chen

(10) Patent No.: US 6,703,794 B2
(45) Date of Patent: Mar. 9, 2004

(54) POWER FACTOR CORRECTION DEVICE INCLUDING ELECTRONIC BALLAST FUNCTION

(75) Inventor: Chi-Jen Chen, Taoyuan (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/150,715

(22) Filed: May 17, 2002

(65) Prior Publication Data

US 2003/0034743 A1 Feb. 20, 2003

(30) Foreign Application Priority Data

Aug. 17, 2001 (TW) ........................................ 90120214 A

(51) Int. Cl.[7] .............................................. H05B 41/16
(52) U.S. Cl. ........................ 315/247; 315/291; 315/307
(58) Field of Search .............................. 315/241 S, 245, 315/247, 224, 291, 307, 246, 275, 276

(56) References Cited

U.S. PATENT DOCUMENTS 6,172,466 B1 * 1/2001 Ki et al. ...................... 351/224
6,181,079 B1 * 1/2001 Chang et al. ................ 315/247
6,300,723 B1 * 10/2001 Wang et al. ................. 315/247
6,359,394 B1 * 3/2002 Stein ........................... 315/307

* cited by examiner

Primary Examiner—Tan Ho
(74) Attorney, Agent, or Firm—Ladas & Parry

(57) ABSTRACT

A power factor correction device including electronic ballast function. The device adds a control circuit to produce the electronic ballast action to reduce harmonic interference, save power and room, and increase system reliability. The device includes a lamp for illumination; an ignitor, connected in series with the lamp to start the illumination; a voltage and current controller, connected in parallel with the series lamp and ignitor to receive the voltage across the lamp and output a feedback control signal according to the received voltage; and a power factor correction controller, connected in parallel with the voltage and current controller to adjust the output current to the lamp according to the feedback control signal so as to protect the entire circuit and increase the system reliability.

6 Claims, 4 Drawing Sheets

POWER FACTOR CORRECTION DEVICE INCLUDING ELECTRONIC BALLAST FUNCTION

BACKGROUND OF THE INVENTION

1. Field of the Invention

The invention relates to a power factor correction device. In particular, the invention relates to a power factor correction device including electronic ballast function, which adds a control circuit to produce the electronic ballast action to reduce harmonic interference, save power and space, and increase system reliability.

2. Description of the Related Art

Electronic ballast power factor refers to an efficient power percentage of an input current actually used in an electronic ballast circuit. In general, an electronic ballast circuit driven by the high-frequency voltage to light a lamp has a higher light output, i.e., to save more power. Hence, the electronic ballast circuit is in widespread use, e.g., various projectors, to replace the conventional ballast circuit and starter. Typically, a projector's lamp lighting circuit separates a power factor correction converter and an electronic ballast circuit as shown in FIG. 1. FIG. 2 is a circuit diagram of a conventional ballast system. In FIG. 2, the system includes a rectifier 21, a power factor correction (PFC) circuit 22, an energy storing capacitor C3, an electronic ballast circuit 24, an ignitor 25 and a lamp. The rectifier 21 includes a full-bridge rectifier comprised of diodes BD1–BD4 to produce a DC output, for example, converting 110 VAC into 150 VDC or 220 VAC into 300 VDC, and a filter capacitor C1 to filter the DC output in order to avoid noise interference coming from rectifier 21. The PFC circuit 22 mainly includes a transformer T1, start resistors R1, R2, a T1-waveform sensing resistor R3, an integrating filter capacitor C2, a block diode D1, a metal-oxide-semiconductor field-effect transistor (MOSFET) switch Q1 and a controller CTRL1. The output of the rectifier 21 is coupled to an end of the start resistor R1 and an end of a first inductor TL1 of the transformer T1. Another end of the start resistor R1 is coupled to an end of the start resistor R2. Another end of the first inductor TL1 is coupled to the source of the switch Q1 and a forward-biased diode D2. Another end of the start resistor R2 is coupled to the input of the controller CTRL1, the grounding integrating filter capacitor C2, and the reverse end of the block diode D1 (node A). The forward end of the block diode (node B) is coupled to an end of the resistor R3 and an end of a second inductor TL2 of the transformer T1. Another end of the second inductor TL2 is to the ground. Another end of the sensing resistor R3 is coupled to the input of the controller CTRL1. The output of the controller CTRL1 is coupled to the gate of the switch Q1 through a resistor R4. The drain of the switch Q1 is coupled to the input of the controller CTRL1 and a grounding resistor R5. In such a configuration, the circuit 22 uses the controller CTRL1 to receive the output voltage sensing from the transformer T1 by the resistor R3 and a feedback signal FB from the drain of the switch Q1. The feedback signal FB is used to modify the output voltage from the two inductors of the transformer T1 to selectively change the ON duty ratio and/or the frequency of the switch Q1 so as to output a correct power factor. The block diode D1 blocks the reserve current from the capacitor C2 discharge to avoid affecting the sensing value of the sensing resistor R3. Hence, the controller cannot output the correct power factor. Similarly, the diode D2 has the same block function as the grounding capacitor C3 storing the DC output from the PFC circuit 22. The load condition will influence the output phase coherence of the current and voltage, for example, in a projector with an incandescent lamp only able to have the same output phase on the voltage and current and the 100% output power factor. However, in practical, load is more complicated, such as, for example, when a high voltage mercury lamp is used, a capacitor (C3) to store the power and an electronic Ballast to keep the power factor output in a steady state, for example, over 0.95, are a must. Typically, as shown in FIG. 2, the circuit 24 includes an MOSFET switch Q2, a shunt LC resonant circuit, a block diode D3 and a controller CTRL2. The source of the switch Q2 connects to the free end of the capacitor C3, the gate to an input signal from the controller CTRL2 through the resistor R6, the drain to the reverse end of the diode D3 and an end of the inductor L1 in the shunt LC circuit. The inductor L1 connects to an end of an external lamp LAMP and the free-end of the grounding capacitor C4 in the shunt LC circuit. The forward end of the diode D3 connects the ground and an end of the resistor R7. Another end of the resistor R7 connects to the controller CTRL2 to produce a feedback signal BFB. Another end of the resistor R7 also connects to an end of the ignitor 25 including a transformer T2 to ignite and a controller CTRL3 to control the transformer T2. Another end of the ignitor 25 connects another end of the lamp LAMP. The controller CTRL2 outputs a control signal to adjust the Q2 output frequency based on the feedback signal BFB, so as to control the output power from the LC resonant circuit having the DC—DC conversion function to the lamp LAMP. The diode D3 having the same function as mentioned the diode D1 above can avoid the feedback signal affected by the reversed current and voltage from the drain of the switch Q2. Further, the reversed current and voltage influence the voltage supply to the lamp LAMP, so as to affect the lighting (projecting) stability of the lamp (i.e., Flicker Index (FI) for light). For example, the lamp's FI over 0.01 can cause vibration on the projecting frame. To solve this problem, the PFC circuit 22 typically keeps the output voltage of the rectifier 21 around 380 VDC and decreases the output voltage to about 85 VDC by the LC resonant circuit in the ballast circuit 24 to provide the lamp LAMP the required voltage. However, this makes the circuitry complicated so as to waste power, space and cost.

SUMMARY OF THE INVENTION

Accordingly, an object of the invention is to provide a power factor correction device including electronic ballast function, which adds a control circuit to produce the electronic ballast action to reduce harmonic interference, save power and room, and increase system reliability.

The invention provides a power factor correction device including electronic ballast function. The device includes a lamp; an ignitor, connected in series with the lamp, to start the illumination; a voltage and current controller, connected in parallel with the cascade lamp and ignitor, to receive the voltage across the lamp and output a feedback signal according to the received voltage; and a power factor correction (PFC) circuit, connected in parallel with the voltage and current controller, to adjust an output power according to the feedback signal to protect the circuit and increase the stability.

BRIEF DESCRIPTION OF THE DRAWINGS

The invention can be more fully understood by reading the subsequent detailed description in conjunction with the examples and references made to the accompanying drawings, wherein.

DETAILED DESCRIPTION OF THE PREFERRED EMBODIMENT

The same element function denotes the same reference number throughout the description.

Figure 1:
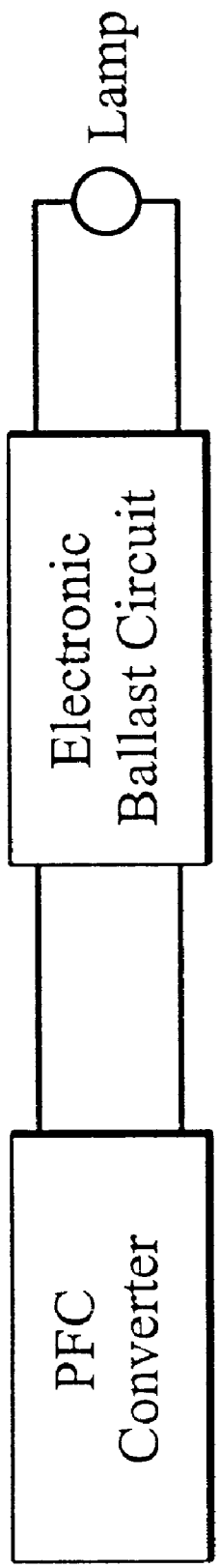
FIG. 1 shows a schematic diagram of the ignitor circuit of a lamp in a typical projector.
Figure 2:
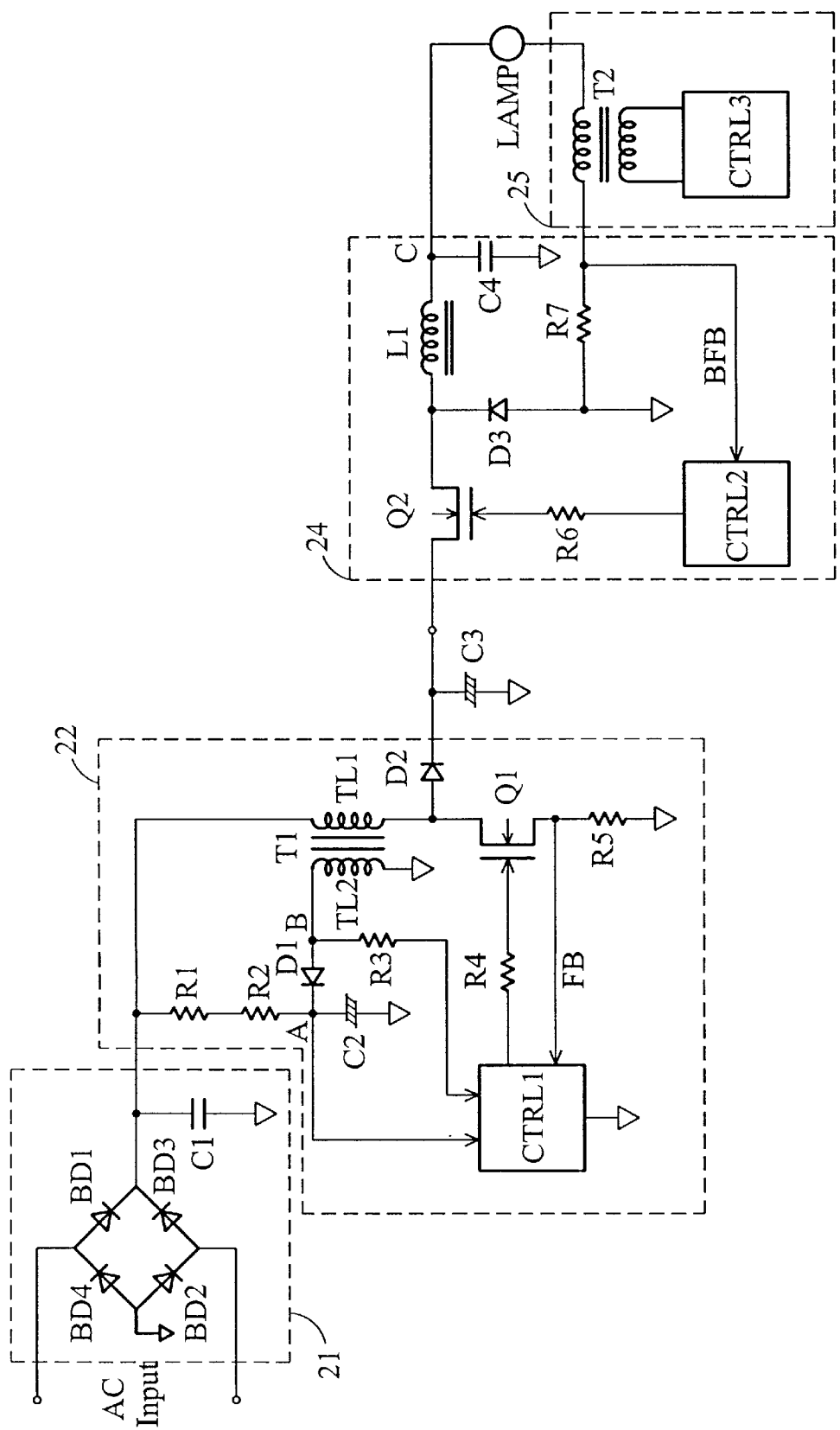
FIG. 2 shows a circuit diagram of a portion of the ignitor circuit in FIG. 1.
Figure 3:
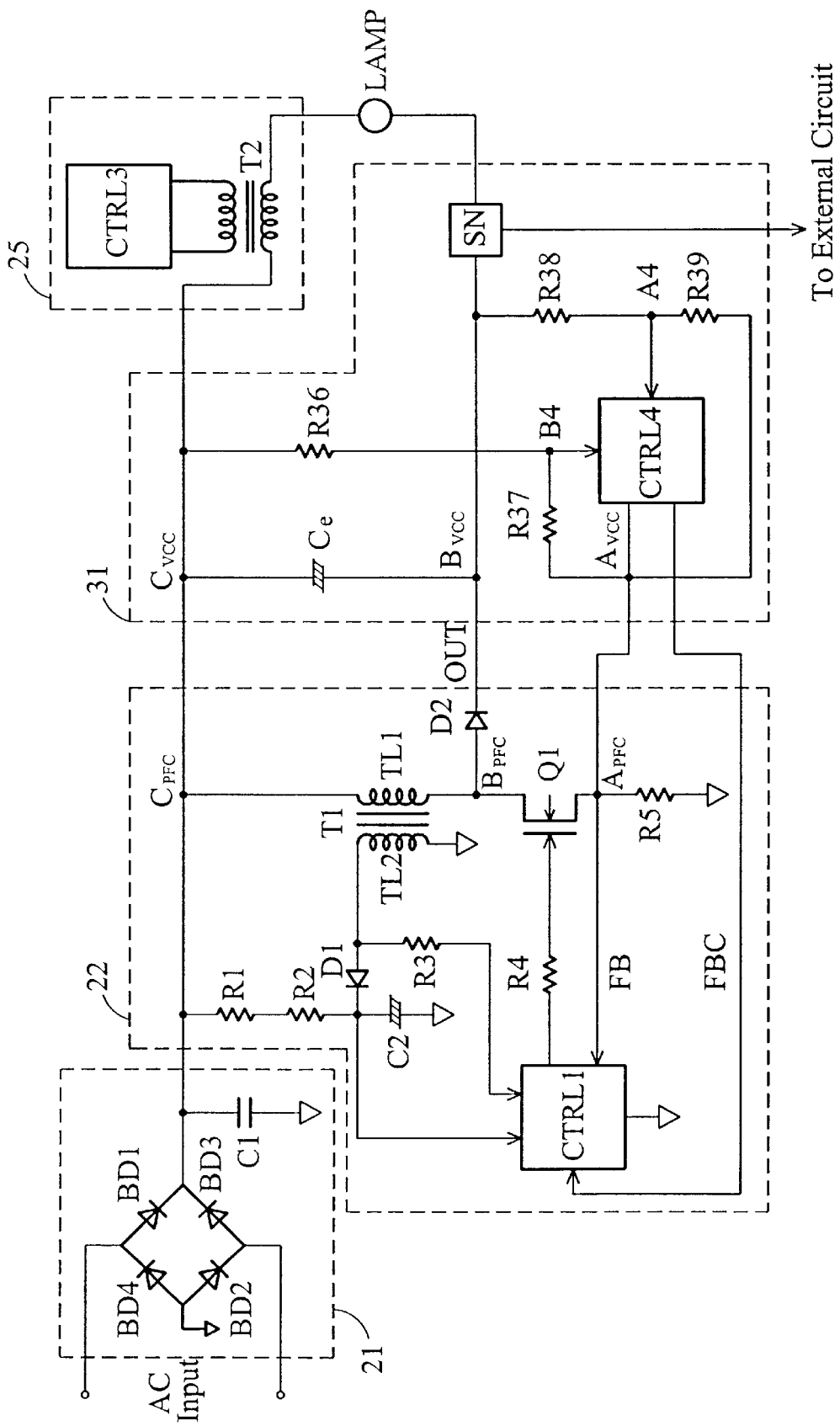
FIG. 3 shows a diagram of an inventive power factor correction circuit including electronic ballast function.

FIG. 3 shows a diagram of an inventive power factor correction circuit including electronic ballast function. In FIG. 3, a ballast circuit re-designed from FIG. 2 is used to connect the power factor correction circuit 22, the ignitor 25 and the lamp LAMP in FIG. 2 in order to form the invention. Therefore, the invention can have the electronic ballast function without the complicated electronic ballast circuitry. As shown in FIG. 3, an additional voltage and current control circuit 31 is used, in addition to the inherent rectifier 21, the power factor circuit 22, the ignitor 25 and the lamp LAMP. The rectifier 21 is responsible to convert an AC from an external power line into a DC. The circuit 22 is responsible to adjust the power factor. The ignitor 25 is responsible to light the lamp LAMP. The lamp LAMP is responsible to illuminate. The voltage and current controller 31 includes a storage capacitor Ce, sensing resistors R36–R39 to measure the voltage difference between the two ends of the lamp LAMP, an external control switch SN and a controller CTRL 4. As shown in FIG. 3, the two ends Cvcc and Bvcc of the storage capacitor Ce are connected between the output of the rectifier 21 and the output OUT of the PFC circuit 22. It is noted that the storage capacitor Ce implementation is different from that in the prior art. The capacitor Ce has a positive end connected to the output of the rectifier 21 and a negative end connected to the output OUT of the PFC circuit 22. However, in the prior art, the negative end of the capacitor C3 is connected to the output of the PFC circuit 22 and the positive end of the capacitor C3 is grounded as shown in FIG. 2. Next, the node Cvcc is connected to an end of the sensing resistor R36 and the ignitor 25. Another end of the sensing resistor R36 is connected to an end of the sensing resistor R37 and an input end of the differential amplifier (not shown) in the controller CTRL4. Another end of the sensing resistor R37 is connected to an end of the sensing resistor R39 and the feedback signal of the PFC circuit 22. Another end of the resistor R39 is connected to an end of the sensing resistor R38 and another input end of the differential amplifier. Another end of the sensing resistor R38 is connected to the node Bvcc and an end of the external control switch SN. Another end of the control switch SN is connected to the positive voltage end of the lamp LAMP.

In the inventive configuration, when the resistance R of the lamp LAMP changes as using time passed, the supplies of the current I and voltage V are adjusted according to the resistance R in order to output fixed power to the lamp LAMP. Hence, the power consumption and brightness on the lamp LAMP are fixed. For this purpose, the controller CTRL4 uses the sensing resistors R36–R39 to input the voltages on two ends of the lamp LAMP respectively to the differential amplifier in the controller CTRL4 and obtain the voltage value across the lamp. The obtained voltage value is fed back into the controller CTRL1 in order to adjust the output and the stored charge in the storage capacitor Ce. The voltage adjustment range is between 20 to 90 VDC. As such, stable output power is produced to keep the lamp's brightness in a steady state and avoid the flicker effect. The external control switch SN is connected to an external control circuit (not shown) to provide an alternative option to light the lamp. The switch SN can be a relay, a MOS or a thyristor.

Figure 4:
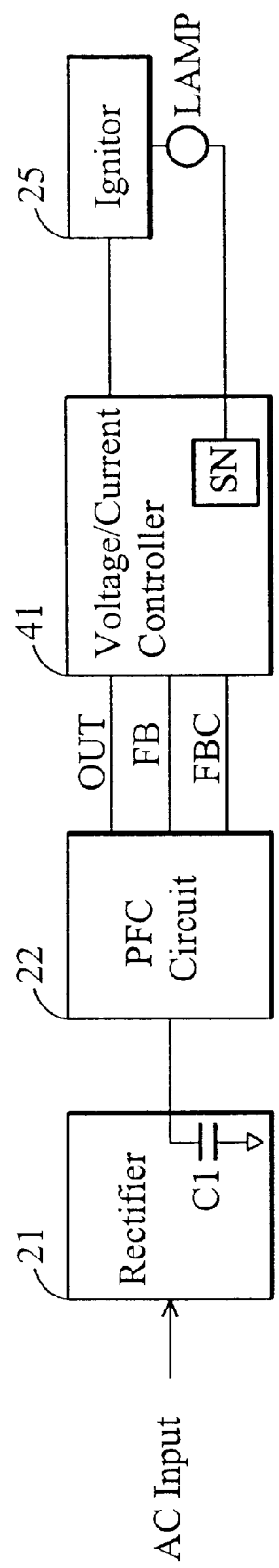
FIG. 4 shows a block diagram of FIG. 3.

FIG. 4 is a functional block diagram of FIG. 3. As shown in FIG. 4, using a rectifier converts an input AC voltage with 110 or 220 VAC into a DC voltage 150 or 300 VDC desired by the operation. The voltage and current control circuit in the PFC circuit is used to produce a feedback control signal FBC to control the PFC circuit to directly supply an output voltage with about 85 VDC to the lamp. As such, a step-down circuit for the ballast circuit is not needed, so as to lower cost, save space and reduce power consumption. When the lamp is an AC lamp, an additional DC-AC inverter (not shown) is needed to provide AC voltage to the lamp. The DC-AC inverter can be implemented by any identical technique in the prior art. For example, a full-bridge or a half-bridge circuit can be used.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A power factor correction device including electronic ballast function, comprising:
   a lamp for illumination;
   a rectifier, to provide a DC operating voltage;
   a storage capacitor, to receive the DC voltage and output a desired voltage for lighting the lamp;
   an ignitor, to light the lamp based on the desired voltage;
   a plurality of sensing resistors, to measure the voltage across the lamp when lighting;
   a voltage and current controller, to produce a feedback control signal according to the measured voltage; and
   a power factor correction controller, to adjust the desired voltage according to the feedback control signal, wherein the power factor correction circuit further comprises:
      a transformer including a first inductor and a grounding second inductor, wherein an end of the first inductor is connected to the positive end of the storage capacitor;
      a start resistor including an end connected to the output of the rectifier, the first inductor and the storage capacitor;
      an integral filter capacitor, connected to another end of the start resistor;
      a block diode, coupled between the grounding second inductor and the connection point of the integral filter capacitor and the start resistor;
      a power sensing resistor, with an end connected to the connection point of the block diode and the grounding second inductor;
      an MOSFET switch including a source, a gate and a drain, the source connected to another end of the first inductor and a forward-biased diode connected to an output of the power factor correction circuit, the drain connected to a grounding resistor for detecting a feedback voltage from the voltage and current controller; and a controller, having an output connected to the gate of the MOSFET switch through an impedance-matched resistor, inputs connected to the output of the voltage and current controller, the connection point of the MOSFET switch and the grounding resistor, another end of the power sensing resistor and the connection point of the start resistor, the block diode and the integral filter capacitor, respectively.

2. The power factor correction device as claimed in claim 1, wherein the lamp is a DC lamp.

3. The power factor correction device as claimed in claim 1, wherein the lamp is an AC lamp.

4. The power factor correction device as claimed in claim 3, wherein the AC lamp needs a DC-AC inverter to provide the AC lamp with AC voltage.

5. The power factor correction device as claimed in claim 4, wherein the DC-AC inverter is a full-bridge circuit.

6. The power factor correction device as claimed in claim 4, wherein the DC-AC inverter is a half-bridge circuit.

* * * * *